(12) United States Patent
Asai et al.

(10) Patent No.: US 6,320,356 B1
(45) Date of Patent: Nov. 20, 2001

(54) POWER UNIT

(75) Inventors: Koichi Asai; Motohiro Shimizu; Hiroyuki Eguchi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,061

(22) Filed: Feb. 17, 2000

(30) Foreign Application Priority Data

Mar. 3, 1999 (JP) .................................................. 11-055322

(51) Int. Cl.[7] .............................. H02M 5/257; H02P 9/00
(52) U.S. Cl. ............................................. 322/27; 363/161
(58) Field of Search ....................... 322/27, 28; 363/10, 363/161; 290/40 B (56) References Cited

U.S. PATENT DOCUMENTS

| 5,585,708 | * | 12/1996 | Richardson et al. | 318/800 |
| 5,886,893 | * | 3/1999 | Asai et al. | 363/161 |
| 5,943,221 | * | 8/1999 | Asai et al. | 363/10 |
| 6,018,200 | * | 1/2000 | Anderson et al. | 290/40 B |
| 6,111,390 | * | 8/2000 | Inaba et al. | 322/28 |
| 6,219,268 | * | 4/2001 | Asai et al. | 363/161 |

FOREIGN PATENT DOCUMENTS

| 60-9429 | 3/1985 | (JP) . |
| 10-52047 | 2/1998 | (JP) . |

* cited by examiner

*Primary Examiner*—Nicholas Ponomarenko
(74) *Attorney, Agent, or Firm*—Frishauf, Holtz, Goodman, Langer & Chick, P.C.

(57) ABSTRACT

A power unit is provided which is capable of controlling electric current to be supplied to a load connected to the power unit, in a flexible manner in dependence on a load condition. Postive and negative converters of a cycloconver are connected to three-phase output windings of a three-phase generator and connected in an antiparallel manner to each other for generating a single-phase alternating current to be supplied to the load. A firing angle control device causes the positive and negative converters to be alternately switched to operate every half a repetition period of the single-phase alternating current, to thereby cause the cycloconverter to generate the single-phase alternating current. A desired wave-forming circuit forms a desired waveform of a drive signal input to the firing angle control device, for causing the firing angle control device to drive the positive and negative converters, such that the output single-phase alternating current has a desired alternating current waveform. An amplitude control circuit changes a shape of the desired waveform in dependence on variation in the load so as to stabilize an output voltage of the cycloconverter. An amplitude-limiting circuit limits amplitude of the desired waveform to a smaller value when the output voltage of the cycloconverter becomes equal to or lower than a predetermined value.

4 Claims, 8 Drawing Sheets

POWER UNIT

BACKGROUND OF THE INVENTION

1. Field of the Invention

This invention relates to a power unit which generates a single-phase AC power having a commercial frequency or a like frequency, and more particularly to a power unit of this kind which uses a cycloconverter having an input side thereof connected to a generator generating relatively small power and is constructed such that electric current to be supplied to a load connected to the power unit is limited when the power unit is in an excessively loaded state or the load is in a nearly short-circuited state.

2. Prior Art

Conventionally, a so-called cycloconverter is known, which directly converts AC power with a fixed frequency to AC power with another frequency.

Such a conventional cycloconverter is normally used for converting power supplied from a commercial frequency power line or power generated by a high power generator (see Japanese Patent Publication (Kokoku) No. 60-9429, for instance), and it is generally used for driving an AC electric motor.

In a conventional power unit using the cycloconverter described above, the cycloconverter is not provided with means for storing energy. Therefore, when the cycloconverter is used to obtain single-phase sinusoidal alternating current, the energy input to the cycloconverter also sinusoidally changes.

Therefore, when a small-sized generator which generates small power e.g. of several hundreds to several thousands kW is connected to the input side of the cycloconverter to generate a single-phase sinusoidal wave, only peak portions of the input sinusoidal waves can be utilized as input energy, so that the utilization efficiency is very low, resulting in only a very small output power being taken out as single-phase alternating current.

To overcome this inconvenience, a power unit has been proposed by the present assignee in Japanese Laid-Open Patent Publication (Kokai) No. 10-52047, in which as the load applied to the power unit increases, a desired waveform of a drive signal for driving the cycloconverter is changed from a sinusoidal waveform to a rectangular waveform which has maximum amplitude thereof limited by the output voltage of the power unit, to thereby keep the cycloconverter operating without difficulty even if an excessive load is applied to the power unit.

However, the conventional power unit is adapted to supply electric current to a load connected thereto under any excessive load condition according to the degree of the applied excessive load, so that even when there is no need to supply electric current to the load, judging from the load condition, the power unit continues to supply the electric current to the load. The load condition under which there is no need to supply electric current to the load includes, for example, an excessive load condition close to a short circuit of the load (including a short-circuited state). When the load is in such a condition, it is not necessary to continue supplying a sufficient amount of electric current to the load.

SUMMARY OF THE INVENTION

It is an object of the present invention to provide a power unit which is capable of controlling electric current to be supplied to a load connected to the power unit, in a flexible manner in dependence on a condition of the load.

To attain the above object, the present invention provides a power unit comprising:

a generator having three-phase output windings;

a pair of variable control bridge circuits connected to the three-phase output windings of the generator and connected in an antiparallel manner to each other to form a cycloconverter for generating single-phase alternating current to be supplied to a load;

a bridge drive circuit for causing the variable control bridge circuits to be alternately switched to operate every half a repetition period of the single-phase alternating current, to thereby cause the cycloconverter to generate the single-phase alternating current;

desired wave-forming means for forming a desired waveform of a drive signal input to the bridge drive circuit, for causing the drive bridge circuit to drive the variable control bridge circuits, such that the single-phase alternating current has a desired alternating current waveform;

waveform-changing means for changing a shape of the desired waveform in dependence on variation in the load so as to stabilize an output voltage of the cycloconverter; and amplitude-limiting means for limiting amplitude of the desired waveform to a smaller value when the output voltage of the cycloconverter becomes equal to or lower than a predetermined value.

According to the power unit of the invention, it is possible to change the shape of the desired wave when the power unit is temporarily excessively loaded, whereby the output from the power unit can be automatically increased to a value close to the upper limit of the whole input energy from the generator, and further under a further excessive load condition of the power unit, the amplitude of the desired waveform is limited to an even smaller value, so that it is possible to flexibly control the electric current to be supplied to the load, according to the load condition of the power unit.

Preferably, the power unit includes comparison means for comparing between the output voltage of the cycloconverter and a desired output voltage, and the waveform-changing means changes the shape of the desired waveform from a sinusoidal one to a rectangular one when the load increases, based on results of comparison by the comparison means.

More preferably, the waveform-changing means changes the shape of the desired waveform from the sinusoidal one to the rectangular one to an increasing degree as the load increases.

More preferably, the amplitude of the desired waveform the amplitude-limiting means limits to an even smaller value when the load becomes nearly short-circuited.

The above and other objects, features, and advantages of the invention will become more apparent from the following detailed description taken in conjunction with the accompanying drawings.

DETAILED DESCRIPTION

The present invention will now be described in detail with reference to the drawings showing an embodiment thereof.

Figure 1:
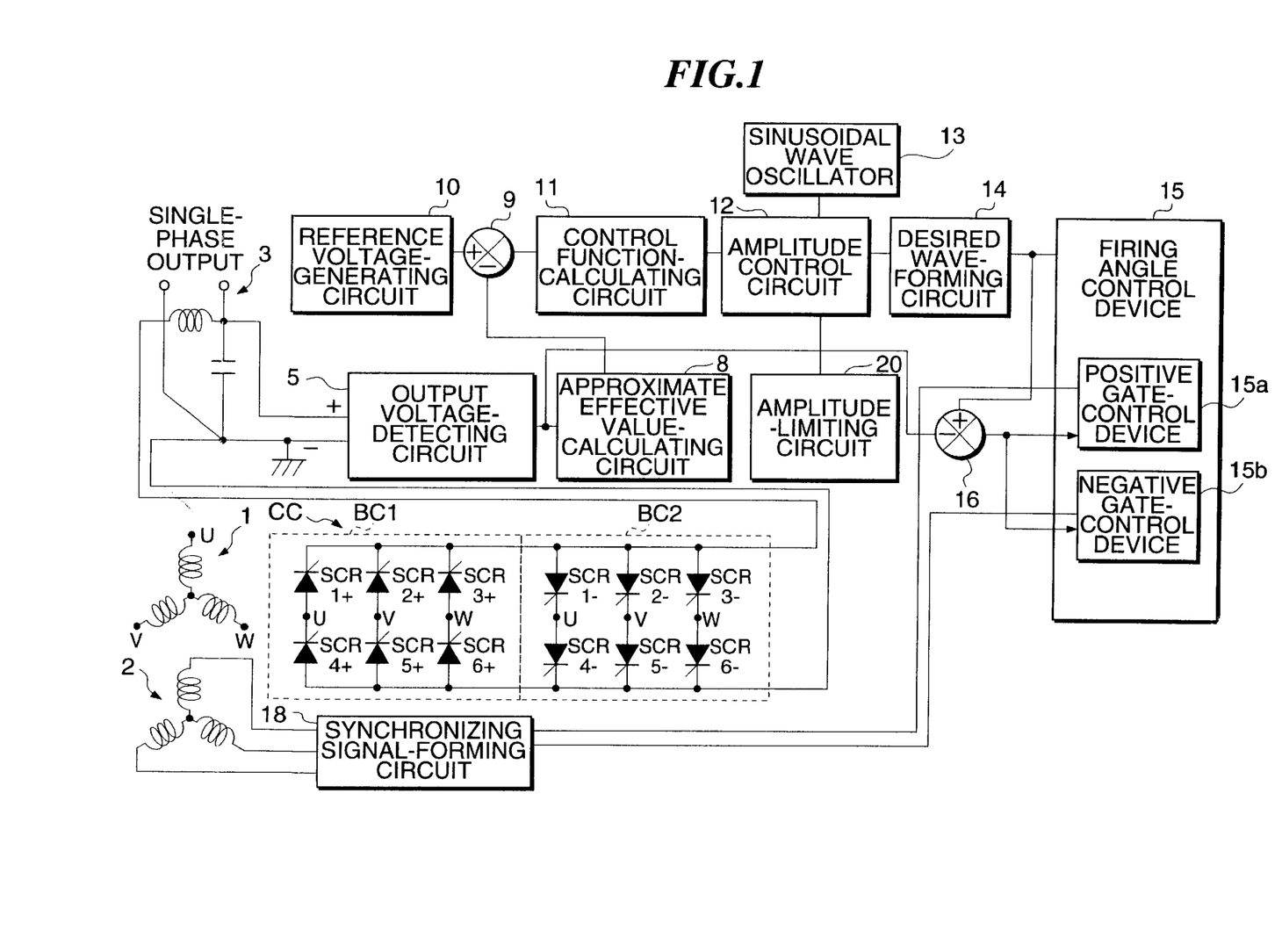
FIG. 1 is a block diagram schematically showing the construction of a power unit according to an embodiment of the invention.

FIG. 1 shows the whole arrangement of a power unit according to an embodiment of the invention.

In the figure, reference numerals 1 and 2 designate output windings independently wound around a stator of an AC generator, i.e. reference numeral 1 designates a three-phase main output winding (hereinafter referred to as the "three-phase main coil"), and reference numeral 2 designates a three-phase auxiliary output winding (hereinafter referred to as the "three-phase sub coil"), respectively.

Figure 2A:
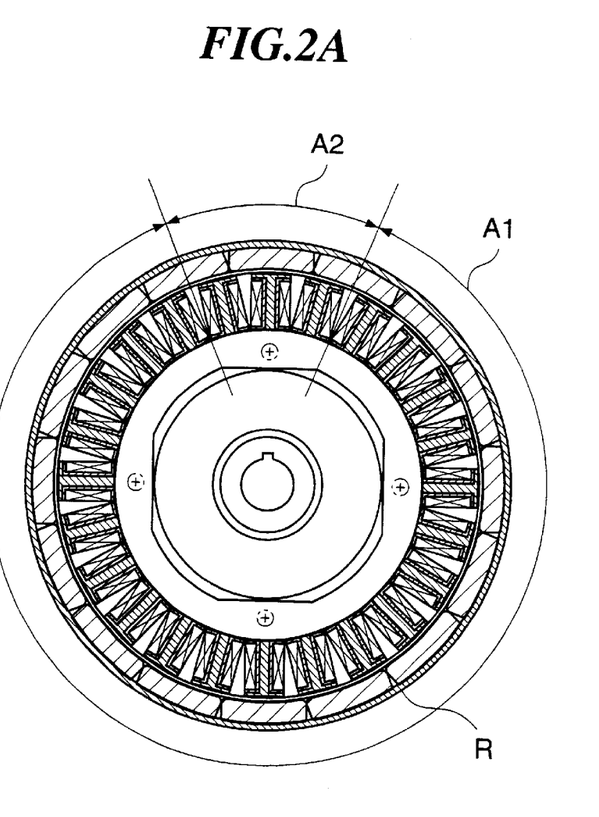
FIG. 2A is a tranverse cross-sectional view of an AC generator appearing in FIG. 1.
Figure 2B:
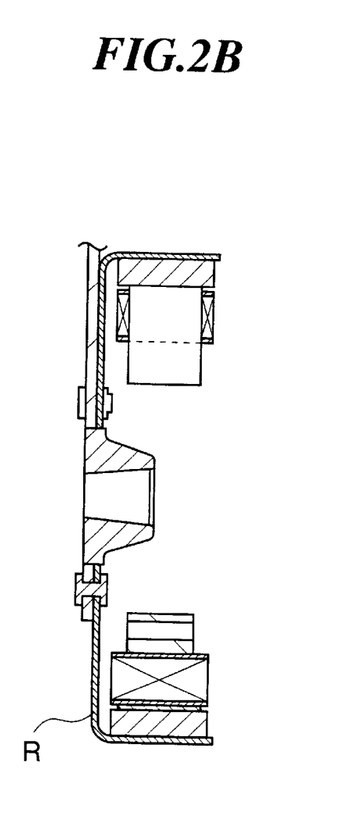
FIG. 2B is a longitudinal cross-sectional view of the AC generator appearing in FIG. 1.

FIGS. 2A and 2B show the construction of the AC generator in longitudinal cross-section and transverse cross-section, respectively. The three-phase main coil 1 is formed of coils forming 21 poles within an area A1, and the three-phase sub coil 2 is formed of coils forming three poles within an area A2. A rotor R is formed with eight pairs of magnetic poles of permanent magnets, and driven for rotation by an internal combustion engine, not shown.

Referring again to FIG. 1, the three-phase main coil 1 has three output terminals U, V, and W thereof connected to respective input terminals U, V and W of each of positive and negative converters BC1 and BC2 of a cycloconverter CC. The cycloconverter CC has an output side thereof connected to an LC filter 3 for removing harmonic components of output current from the cycloconverter CC. An output side of the LC filter 3 is connected to an output voltage-detecting circuit 5 for detecting a voltage of the output current with the harmonic components removed, delivered from the LC filter 3. The output voltage-detecting circuit 5 has a negative input terminal thereof connected to ground GND of a control system of the power unit, whereby a single-phase output is obtained from a positive input terminal of the output voltage-detecting circuit 5 and the negative one of the same.

The output voltage-detecting circuit 5 has an output side thereof connected to an approximate effective value-calculating circuit 8 for calculating an approximate effective value of the output voltage from the circuit 5. The circuit 8 has an output side thereof connected to a negative input terminal of a comparator 9. Connected to a positive input terminal of the comparator 9 is a reference voltage-generating circuit 10 for generating a reference output voltage value for the power unit. The comparator 9 has an output side thereof connected to a control function-calculating circuit 11 which calculates a control function, such as a linear function, based on results of the comparison by the comparator 9.

The control function-calculating circuit 11 has an output side thereof connected to an amplitude control circuit 12 which controls amplitude of a sinusoidal wave having a commercial frequency of 50 Hz or 60 Hz delivered from a sinusoidal wave oscillator 13 connected thereto. Further, also connected to the amplitude control circuit 12 is the output side of an amplitude-limiting circuit 20 for limiting the amplitude of the sinusoidal wave according to the approximate effective value of the output voltage calculated by the approximate effective value-calculating circuit 8.

The amplitude control circuit 12 generates an amplitude control signal for controlling the amplitude of the sinusoidal wave delivered from the sinusoidal wave oscillator 13, based on the control function delivered from the control function-calculating circuit 11 and an amplitude-limiting signal (limit value) delivered from the amplitude-limiting circuit 20.

The amplitude control circuit 12 has an output side thereof connected to a desired wave-forming circuit 14 which generates a desired wave in response to the amplitude control signal from the circuit 12. The desired wave-forming circuit 14 has an output side thereof connected to a firing angle control device 15 for controlling the firing angle of a gate of each of thyristors SCRk± constituting the cycloconverter CC, as well as to a positive input terminal of a comparator 16.

The firing angle control device 15 is comprised of a positive gate control device 15a for controlling the firing angles of gates of the thyristors SCRk+ of the positive converter BC1 (hereinafter referred to as "the positive gates"), and a negative gate control device 15b for controlling the firing angles of gates of the thyristors SCRk− of the negative converter BC2 (hereinafter referred to as "the negative gates").

The positive and negative gate control devices 15a, 15b each have six comparators, not shown, each of which compares the desired wave with a synchronizing signal (reference saw-tooth wave), referred to hereinafter, and fires a corresponding gate when the two waves agree with each other.

The comparator 16 has a negative input terminal thereof connected to the output side of the output voltage-detecting circuit 5 and an output terminal thereof connected to the positive gate control device 15a and the negative gate control device 15b. The comparator 16 compares the output voltage from the output voltage-detecting circuit 5 with the desired wave, and selectively delivers a high (H) level signal or a low (L) level signal depending upon results of the comparison.

When the H level signal is delivered from the comparator 16, the positive gate control device 15a is enabled while the negative gate control device 15b is disabled. On the other hand, when the L level signal is delivered from the same, the positive gate control device 15a is disabled while the negative gate control device 15b is enabled.

Figure 3:
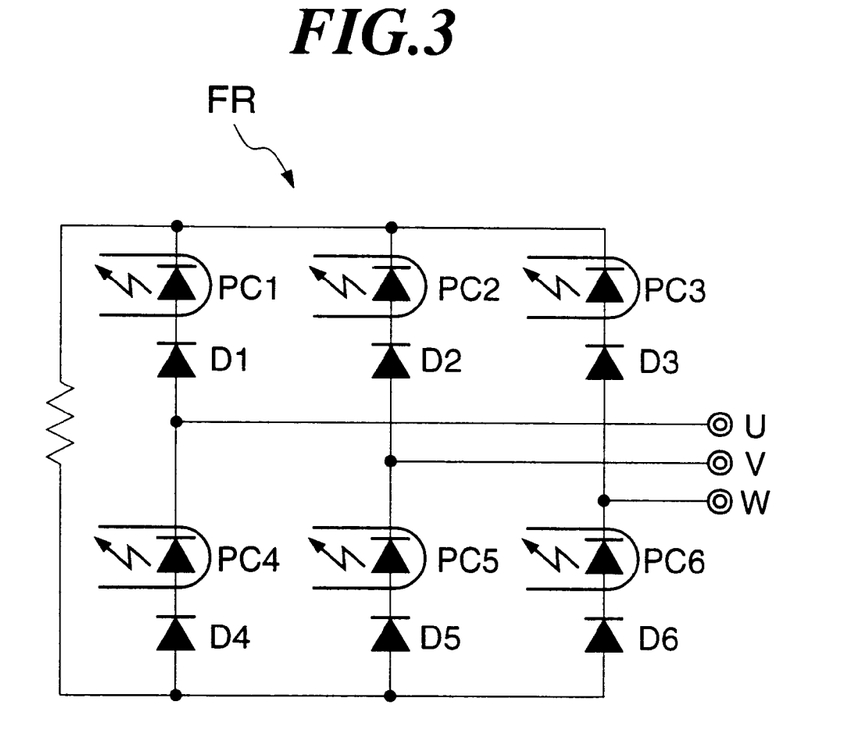
FIG. 3 is a circuit diagram showing the construction of a three-phase full-wave bridge rectifier.

The output side of the three-phase sub coil 2 is connected to a synchronizing signal-forming circuit 18 e.g. including a three-phase full-wave bridge rectifier FR shown in FIG. 3. The synchronizing signal-forming circuit 18 forms and delivers saw-tooth waves shown in FIG. 4 in response to a three-phase output from the three-phase sub coil 2.

Figure 4:
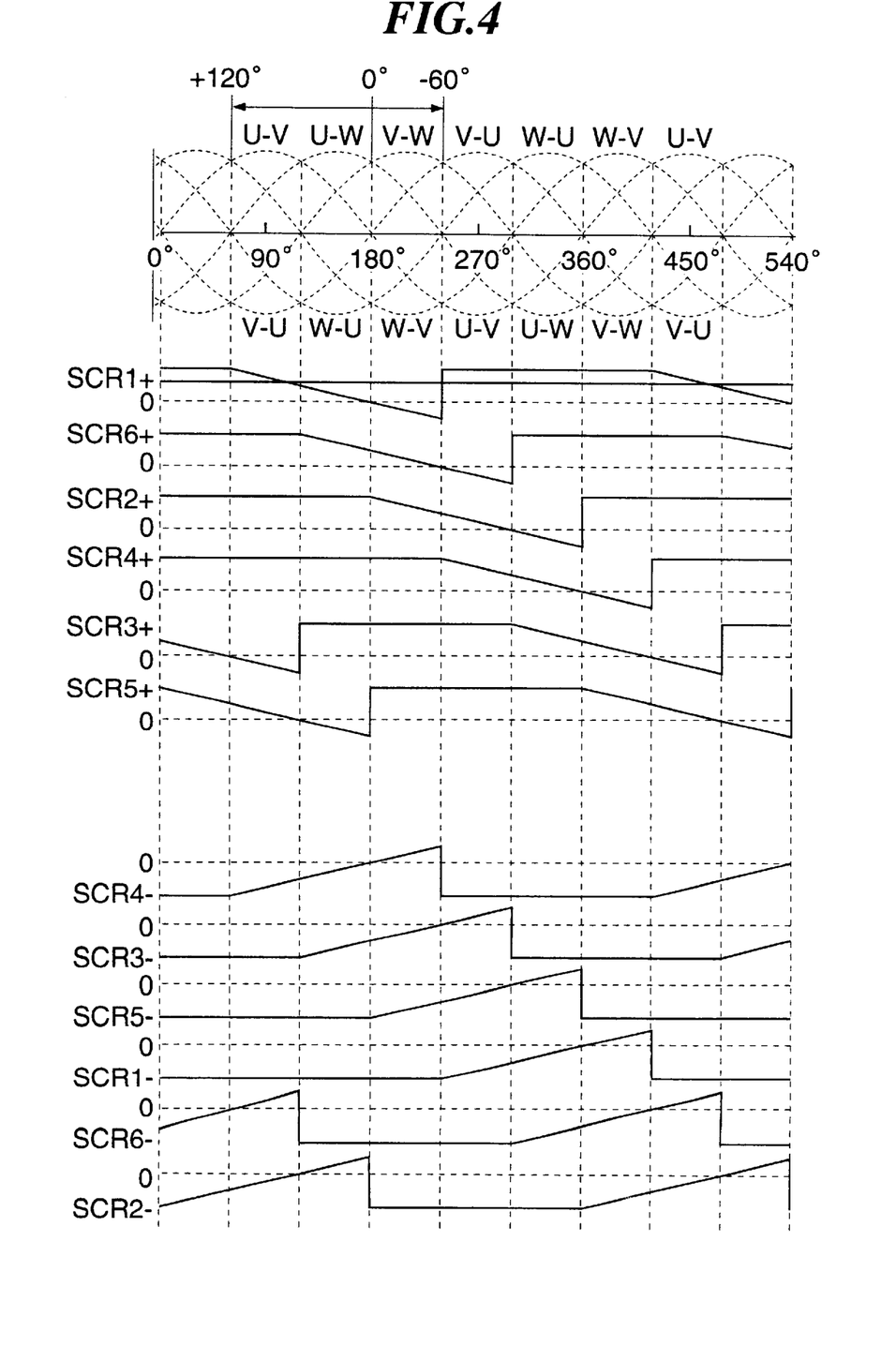
FIG. 4 is a diagram showing, by way of example, reference saw-tooth waves generated for controlling firing angles of thyristors appearing in FIG. 1 when the firing angle of each thyristor is controlled in a range of 120° to −60°.

FIG. 4 shows examples of saw-tooth waves which are capable of controlling the firing angles of the gates of the thyristors SCRk± to a range of 120° to −60° set as the control firing angle range.

The synchronizing signal-forming circuit 18 has an output side thereof connected to the positive gate control device 15a and the negative gate control device 15b. Connection lines between the synchronizing signal-forming circuit 18 and the positive and negative gate control devices 15a, 15b are each formed by six signal lines which are connected to respective corresponding ones of the six comparators of each of the gate control devices 15a and 15b for supplying them with the respective sawtooth waves shown in FIG. 4.

The six comparators of the positive control device 15a have output sides thereof connected to the gates of respective corresponding ones of the thyristors SCRk+ of the positive converter BC1, while the six comparators of the negative control device 15b have output sides thereof connected to the gates of respective corresponding ones of the thyristors SCRk− of the negative converter BC2.

Although in the present embodiment, the synchronizing signal-forming circuit 18 is constructed such that it forms synchronizing signals (reference sawtooth waves) in response to the three-phase outputs from the three-phase sub coil 2, this is not limitative, but a single-phase sub coil may be employed in place of the three-phase sub coil 2 to form a synchronizing signal (reference sawtooth wave) in response to the single-phase output.

Next, the operation of the power unit constructed as above will be described.

As the rotor R is driven for rotation by the engine, voltages are produced between the three-phase output terminals of the three-phase main coil 1 as described above. Then, as the gate of each of the thyristors SCRk± is fired by the firing angle control device 15, the cycloconverter CC delivers electric current, and the filter 3 removes harmonic components from the electric current. The output voltage-detecting circuit 5 detects the voltage of the electric current. The approximate effective value-calculating circuit 8 calculates the approximate effective value of the voltage based on the voltage thus detected and generates a signal indicative of the calculated approximate effective value.

The comparator 9 compares the approximate effective value with the reference voltage value delivered from the reference voltage-generating circuit 10, and the control function-calculating circuit 11 calculates the control function (linear function) based on results of the comparison to deliver the calculated function. More specifically, the control function-calculating circuit 11 calculates the linear function such that a proportional coefficient (constant of proportionality) of the linear function is increased as the output from the comparator 9 increases, that is, as the difference between the reference voltage value from the reference voltage-generating circuit 10 and the approximate effective value from the approximate effective value-calculating circuit 8 is larger.

The approximate effective value of the output voltage is also supplied to the amplitude-limiting circuit 20, which delivers the limit value according to the approximate effective value.

The amplitude control circuit 12 generates a control signal for controlling the amplitude of the sinusoidal wave of 50 Hz or 60 Hz delivered from the sinusoidal oscillator 13, based on the control function from the control function-calculating circuit 11 and the limit value from the amplitude-limiting circuit 20, and the desired wave-forming circuit 14 forms the desired wave based on the control signal and outputs the same. Predetermined upper and lower limit values are provided for the output or control signal from the desired wave-forming circuit 14, and the desired wave-forming circuit 14 is constructed such that it cannot generate a voltage value higher than the predetermined upper limit value or lower than the predetermined lower limit value. That is, as the output value from the comparator 9 increases so that the proportional coefficient of the linear function from the control function-calculating circuit 11 increases, the shape of the desired wave from the desired wave-forming circuit 14 is changed from a sinusoidal one to a rectangular one.

The comparator 16 compares the desired wave from the desired wave-forming circuit 14 with the detected wave from the output voltage-detecting circuit 5. When the former is higher in voltage than the latter, a high level (H) signal is generated from the comparator 16 to enable the positive gate control device 15a, whereas when the former is lower in voltage than the latter, a low level (L) signal is generated from the comparator 16 to enable the negative gate control device 15b.

The comparators of the selected one of the positive gate control device 15a and the negative gate control device 15b each compare the desired wave from the desired wave-forming circuit 14 with a corresponding sawtooth wave from the synchronizing signal-forming circuit 18. When the desired wave agrees with or intersects the sawtooth wave, a one-shot pulse having a predetermined wavelength is delivered from the gate control device 15 to the gate of a corresponding one of the thyristors SCRk± to control the firing angle thereof.

Figure 5A:
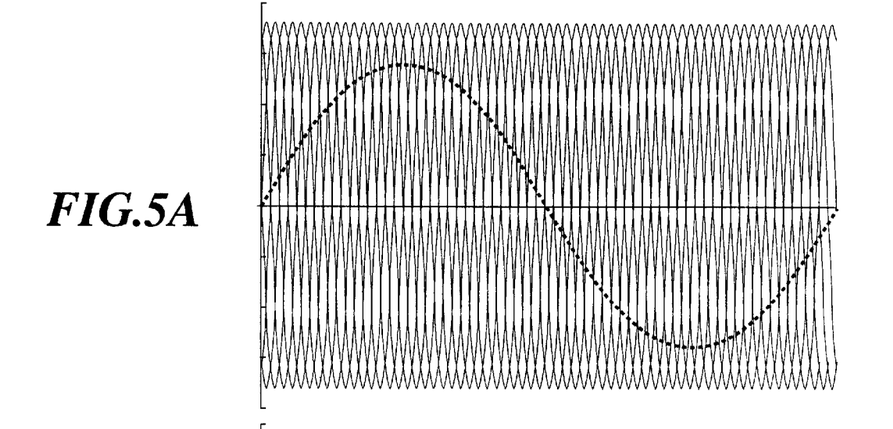
FIGS. 5A to 5C are diagrams showing examples of waveforms of 50 Hz outputs delivered from the FIG. 1 power unit under respective different load conditions.
Figure 5B:
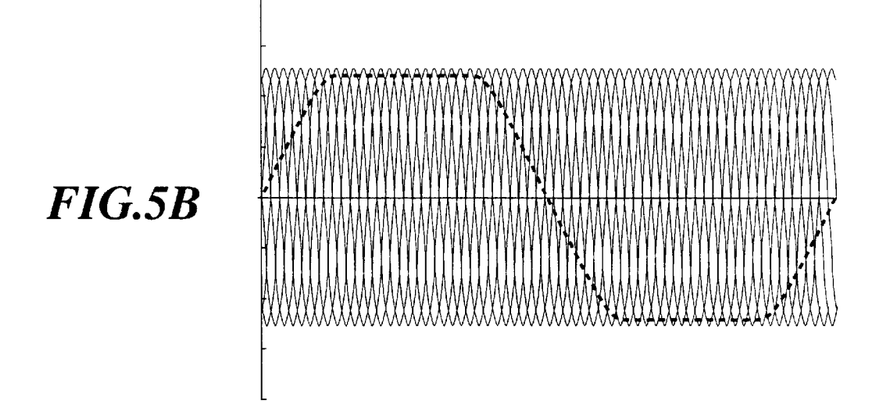
Figure 5C:
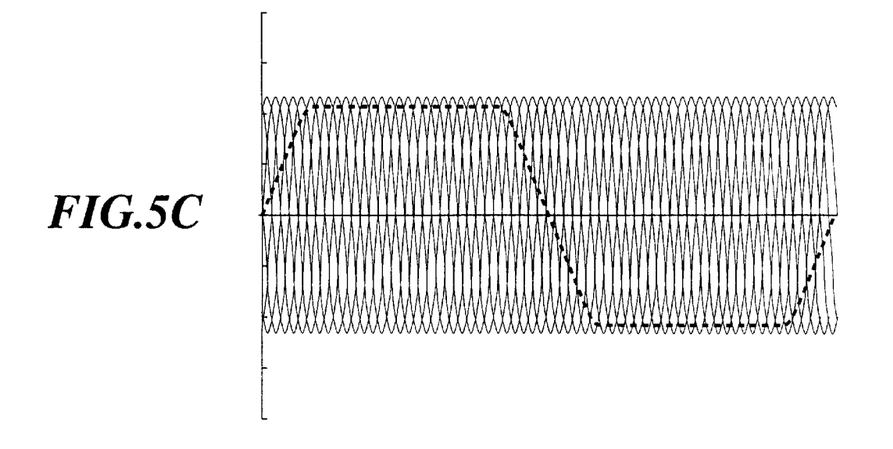

FIGS. 5A to 5C show examples of output waveforms of 50 Hz generated by the power unit of the present embodiment. FIG. 5A shows an output waveform generated when the power unit is under a no-load condition, FIG. 5B an output waveform under a rated load condition, and FIG. 5C an output waveform under an excessive load condition.

As shown in these figures, when an excessive load is temporarily applied to the power unit, the output waveform of the cycloconverter is changed from a sinusoidal one to a rectangular one, depending upon the degree of the applied excessive load, i.e. the difference between the reference voltage from the reference voltage-generating circuit 10 and the approximate effective value from the approximate effective value-calculating circuit 8.

Although in the present embodiment, the shape of the desired wave is changed from a sinusoidal one to a rectangular one according to the load condition, this is not limitative, but when the power unit is constructed such that the output voltage is limited by the maximum amplitude, the amplitude of the desired wave may be increased according to the load condition.

Figure 6A:
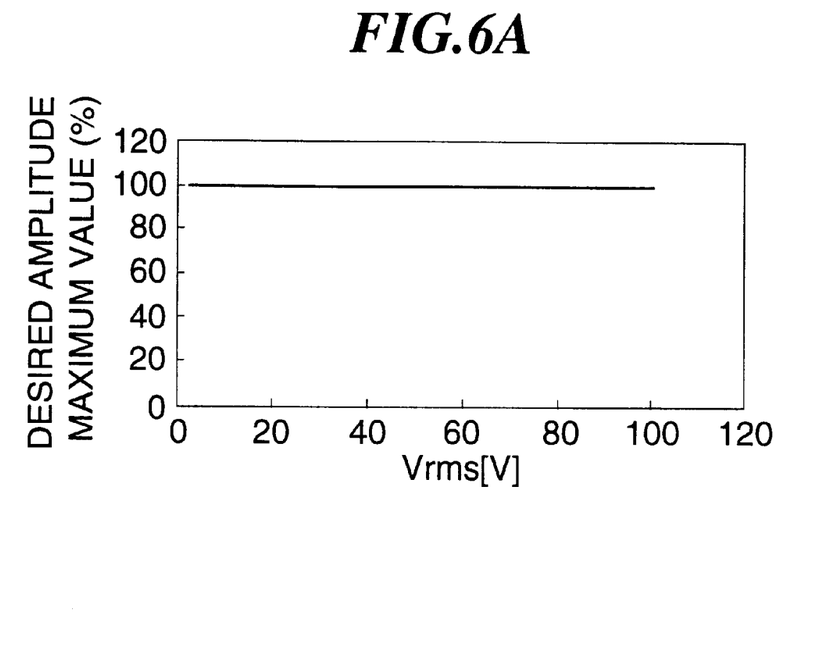
FIG. 6A is a diagram showing an example of desired wave maximum amplitude value-output voltage characteristics exhibited when the amplitude of a desired wave is not limited.
Figure 6B:
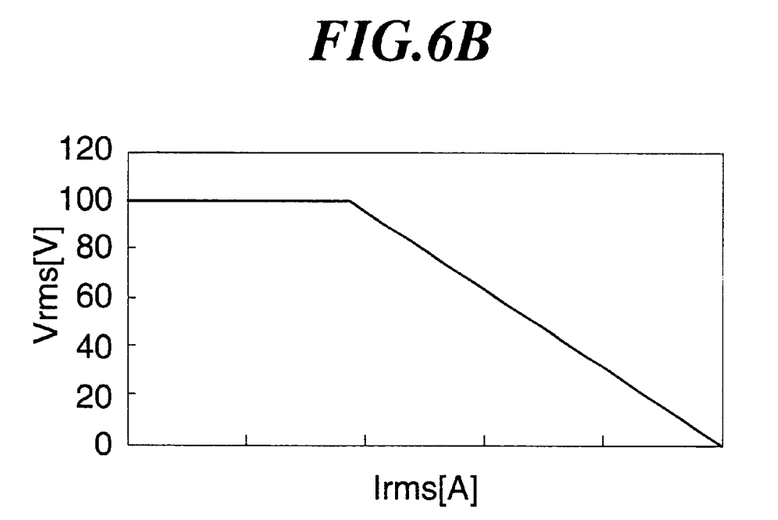
FIG. 6B is a diagram showing an example of output voltage-output current characteristics exhibited when the amplitude of the desired wave is not limited.

FIGS. 6A and 6B show examples of desired wave maximum amplitude value-output voltage characteristics (FIG. 6A) and output voltage-output current characteristics (FIG.

Figure 7A:
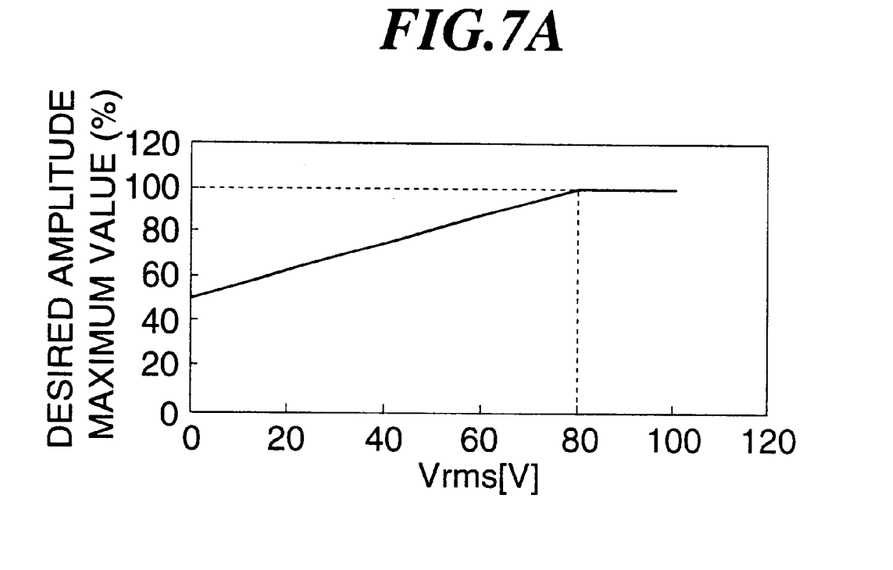
FIG. 7A is a diagram showing an example of the desired wave maximum amplitude value-output voltage characteristics exhibited when the amplitude of the desired wave is limited under a predetermined excessive load condition.
Figure 7B:
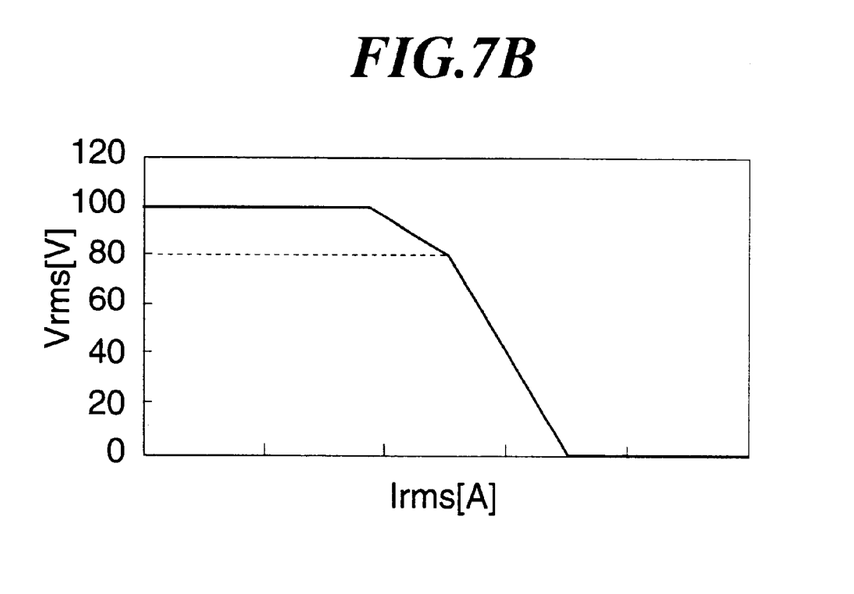
FIG. 7B is a diagram showing an example of the output voltage-output current characteristics exhibited when the amplitude of the desired wave is limited under the predetermined excessive load condition.
Figure 8A:
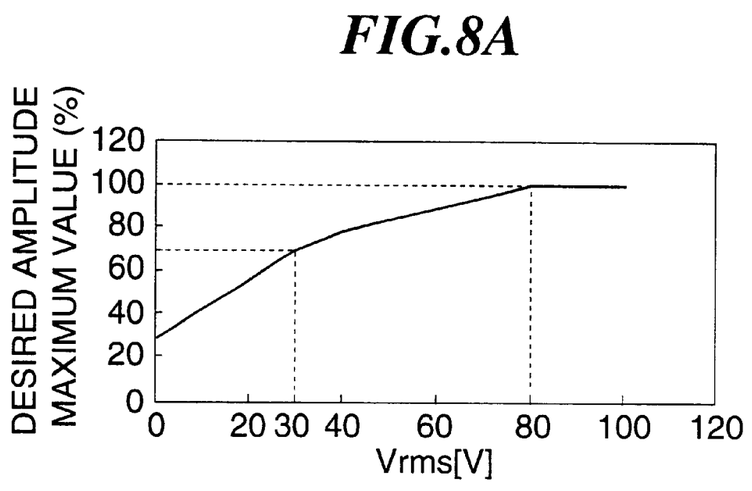
FIG. 8A is a diagram showing an example of the desired wave maximum amplitude value-output voltage characteristics exhibited when the amplitude of the desired wave is further limited in the case of the load being nearly short-circuited.
Figure 8B:
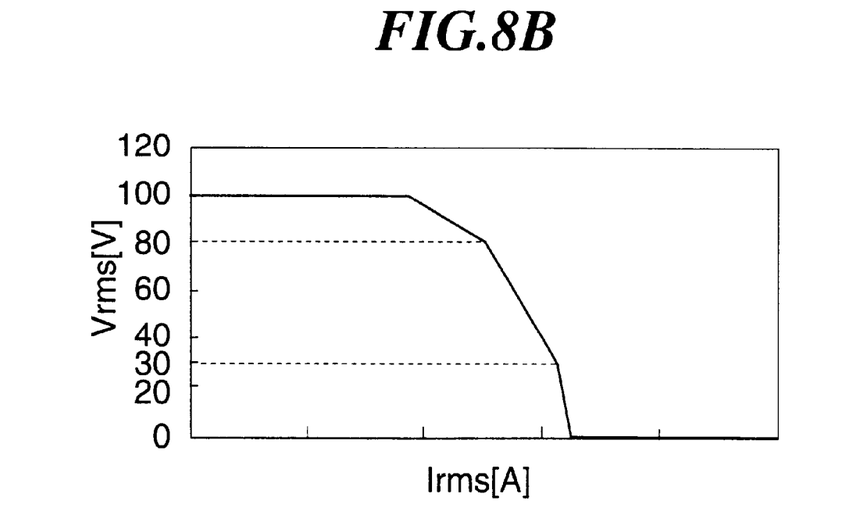
FIG. 8B is a diagram showing an example of the output voltage-output current characteristics exhibited when the amplitude of the desired wave is further limited in the case of the load being nearly short-circuited.

6B) exhibited when the amplitude of the desired wave is not limited. FIGS. 7A and 7B show examples of the desired wave maximum amplitude value-output voltage characteristics (FIG. 7A) and the output voltage-current characteristic (FIG. 7B) exhibited when the amplitude of the desired wave is limited under a predetermined excessive load condition of the power unit, while FIGS. 8A and 8B show examples of the desired wave maximum amplitude value-output voltage characteristics (FIG. 8A) and the output voltage-current characteristic (FIG. 8B) both exhibited when the amplitude of the desired wave is further limited in the case of the load being nearly short-circuited. In FIGS. 6A to 8B, "rms" represents the effective value (root mean square).

The output waveforms shown in FIGS. 5A to 5C are generated according to the load condition of the power unit when the amplitude of the desired wave is not limited as shown in FIGS. 6A and 6B.

On the other hand, in the case of FIG. 7A, the amplitude (maximum amplitude value) of the desired wave starts to be limited (more specifically, the limit value starts to be limited), as shown in FIG. 7A, such that it is reduced linearly with respect to the output voltage, at a time point the power unit is placed under an excessive load condition, e.g. when the output voltage (i.e. the approximate effective value of the voltage calculated by the approximate effective value-calculating circuit 8) is reduced to 80 V. Accordingly, the amplitude of the output waveform is limited such that it is smaller than that of the waveform shown in FIG. 5C. As a result, as shown in FIG. 7B, after the output voltage has been reduced to 80 V, the amount of increase in the output current decreases more sharply than in the case of the amplitude of the desired wave not being limited (see FIG. 6B).

FIGS. 8A and 8B show a case in which the amplitude of the desired wave is limited under a predetermined excessive load condition, similarly to the case of the example shown in FIGS. 7A and 7B, and further limited when the load is nearly short-circuited. When the amplitude of the desired wave is further limited, as shown in FIG. 8A, at a time the load becomes nearly short-circuited, e.g. when the output voltage is reduced to 30 V, the amplitude of its output waveform is further reduced, and after the output voltage has been reduced to 30V, the amount of increase in the output current decreases even more sharply than when the output voltage is between 30 V and 80 V (see FIG. 7B).

Although in the present embodiment described above, the amplitude of the desired wave is further limited when the load becomes nearly short-circuited, while the output current is still increased (with the amount of increase being progressively decreased), this is not limitative, but the amplitude of the desired wave may be limited when the load becomes nearly short-circuited, such that the amount of output current is decreased to a lower value than before.

What is claimed is:

1. A power unit comprising:

a generator having three-phase output windings;

a pair of variable control bridge circuits connected to said three-phase output windings of said generator and connected in an antiparallel manner to each other to form a cycloconverter for generating a single-phase alternating current to be supplied to a load;

a bridge drive circuit for causing said variable control bridge circuits to be alternately switched to operate every half a repetition period of said single-phase alternating current, to thereby cause said cycloconverter to generate said single-phase alternating current;

desired wave-forming means for forming a desired waveform of a drive signal input to said bridge drive circuit, for causing said drive bridge circuit to drive said variable control bridge circuits, such that said output single-phase alternating current has a desired alternating current waveform;

waveform-changing means for changing a shape of said desired waveform in dependence on variation in said load so as to stabilize an output voltage of said cycloconverter; and amplitude-limiting means for limiting amplitude of said desired waveform to a smaller value when said output voltage of said cycloconverter becomes equal to or lower than a predetermined value.

2. A power unit according to claim 1, including comparison means for comparing between said output voltage of said cycloconverter and a desired output voltage, and wherein said waveform-changing means changes said shape of said desired waveform from a sinusoidal one to a rectangular one when said load increases, based on results of comparison by said comparison means.

3. A power unit according to claim 2, wherein said waveform-changing means changes said shape of said desired waveform from said sinusoidal one to said rectangular one to an increasing degree as said load increases.

4. A power unit according to claim 2, wherein said amplitude-limiting means limits said amplitude of said desired waveform to an even smaller value when said load becomes nearly short-circuited.

* * * * *